E. H. RICHARDSON.
THERMIC CONTROLLER.
APPLICATION FILED MAY 14, 1908.
937,332.  Patented Oct. 19, 1909.
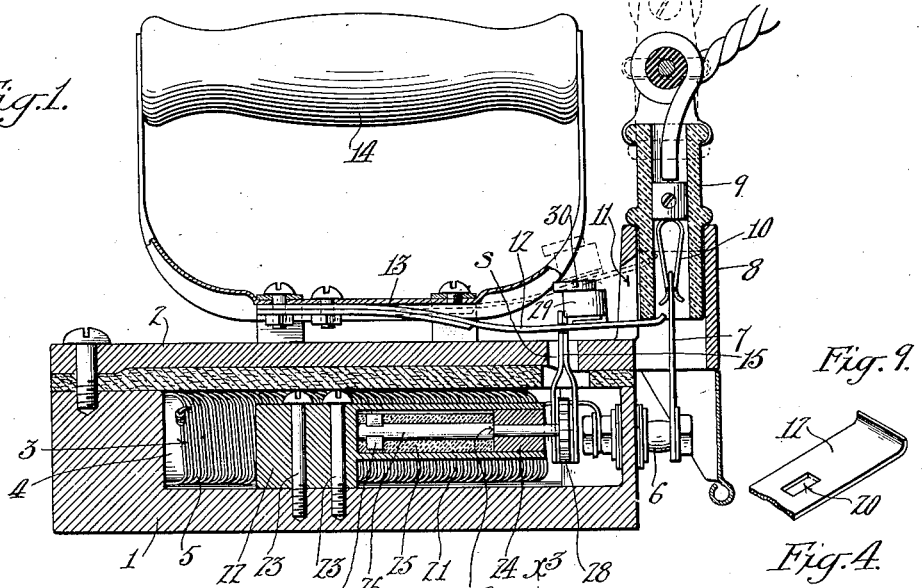
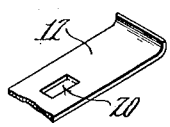
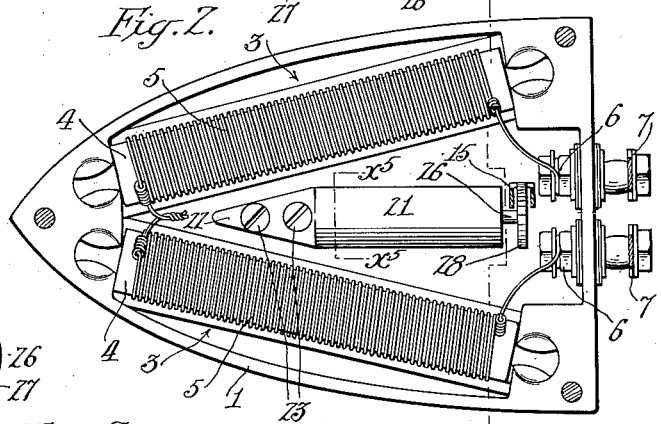
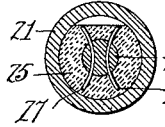
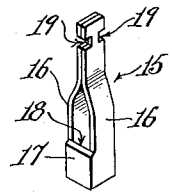
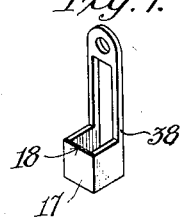
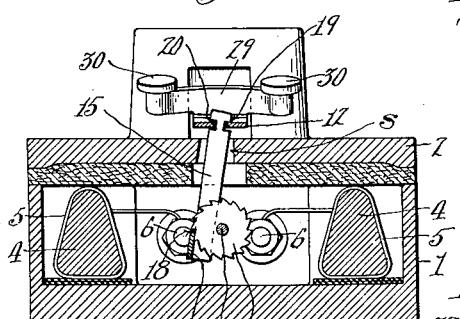
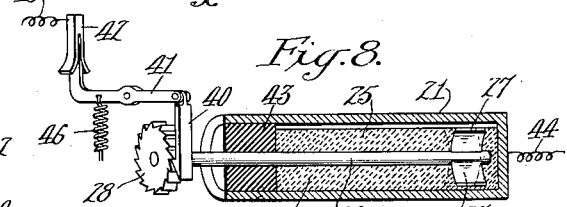

UNITED STATES PATENT OFFICE.

EARL H. RICHARDSON, OF ONTARIO, CALIFORNIA, ASSIGNOR TO PACIFIC ELECTRIC HEATING COMPANY, A CORPORATION OF CALIFORNIA.

THERMIC CONTROLLER.

937,332.

Specification of Letters Patent.

Patented Oct. 19, 1909.

Application filed May 14, 1908. Serial No. 434,944.

*To all whom it may concern:*

Be it known that I, EARL H. RICHARDSON, a citizen of the United States, residing at Ontario, in the county of San Bernardino and State of California, have invented a new and useful Thermic Controller, of which the following is a specification.

This invention relates to a device which automatically operates upon a change of temperature to effect a control of the device or instrument with which it is employed.

The device is adapted for use in connection with a great variety of mechanisms. For example, it may be utilized for controlling an electric switch in an electric heater whereby when the heat reaches a certain degree the device will automatically operate to open the switch and cut out the current through the heater, or it may be employed for controlling a switch used in any other capacity, for instance as a circuit breaker or as a fuse, or the device may be employed for controlling or operating a valve, such, for instance, as a valve in an automatic sprinkler wherein when the temperature reaches a predetermined degree the device automatically operates to shift the valve and permit water to be admitted to a coil of sprinkling pipe from which it is discharged to extinguish a fire.

More particularly the device comprises a fusible material or a material the consistency of which becomes softer upon a change of temperature, in which material is a movable element which is anchored by the material and prevented from movement when the material is relatively hard, and which is permitted to move when the material fuses or becomes softer, the said movable element serving to effectuate the operations required.

A further feature of the invention is to so confine the material that when it fuses or becomes soft it will be kept within substantially the same limits, and when it cools it will harden to its original consistency while still confined within the same limits, so that the same material is capable of exercising this function repeatedly for an indefinite number of times, and never requires renewal, it being constantly confined and never escaping from its confinement.

A further object of the invention is to provide means whereby the action of the movable element is entirely automatic so that after the movable element in the material has made its movement, the said element does not have to be re-set. Thus the material may soften and permit the element to move, the material then hardens and again anchors the element against movement, and the said element is then ready for operation again upon fusing or softening of the material.

In the accompanying drawings I have shown the device as employed in three capacities, viz: as applied to an electric laundry iron, as applied to a valve for controlling a fire extinguishing sprinkler, and applied as a fuse or circuit breaker for general purposes in which a fuse or circuit breaker is employed.

Referring to the drawings Figure 1 is a vertical longitudinal section through an electric laundry iron equipped with the invention. Fig. 2 is a plan view of the lower part of the iron with the cover removed. Fig. 3 is a cross section on line $X^3$—$X^3$ Fig. 2. Fig. 4 is a perspective view of the pawl. Fig. 5 is an enlarged cross section on line $X^5$—$X^5$ Fig. 2. Fig. 6 is a side elevation, partly in section, of a part of a sprinkling system equipped with the device. Fig. 7 is a perspective of the pawl employed in the construction illustrated in Fig. 6. Fig. 8 is a perspective, partly in section, of the device employed as a fuse or circuit breaker. Fig. 9 is a perspective of an end portion of the flat spring used in Fig. 1.

The laundry iron comprises a hollow body 1, having a removable cover 2. Within the hollow body 1 is a pair of heating units 3, each heating unit comprising a core 4, which is wound with resistance wire 5, the two coils of wire being tied together at the front end and the respective wires being connected at the rear to binding posts 6 which extend through the rear wall of the body of the iron. Each binding post 6 carries a terminal blade 7, and the cover 2 is provided with a box 8 forming a receptacle for a removable switch plug 9. The switch plug 9 is provided with two pairs of clips 10, each pair of clips being slidable over the end of the associated terminal blade 7 as indicated in Fig. 1. The front wall of the box 8 is provided with a slot 11, through which projects a flat spring 12 which is secured underneath a bail 13, the latter secured to the cover 2 and provided with a handle 14. The rear end of the spring 12 lies under the plug 9 as shown in Fig. 1 and the spring 12 is normally held in depressed position by means of a pawl 15 shown in detail in Fig. 4. The pawl 15 is formed preferably of a single piece of sheet metal and comprises two side members 16, bridged at the bottom by a cross bar 17 having an upper beveled edge 18. The members 16 are brought together at the top and notched at 19 and the spring 12 has an elongated slot 20 as shown in Fig. 8 with which the notches 19 are engaged. The pawl may be detachably connected to spring 12 by inserting its upper end through slot 20 and then turning the pawl so that notches 19 engage on each side of slot 20. The notches 19 and slot 20 are of sufficient size to give a rather loose connection, so that the pawl can swing laterally to the spring 12. The pawl 15 projects down through a slot S in the cover 2.

A fuse receptacle is arranged in the hollow body 1 and in the form shown it comprises a horizontal barrel 21 which projects rearwardly from a wedge shaped head 22, the latter being secured to the body 1 by screws 23 and supporting the barrel 21 in a position above the lower wall of the body and between the two heating units 3, so that the entire surface of the barrel 21 is surrounded by an air space. The rear end of the barrel 21 is closed by a bushing 24 which serves to confine within the barrel a fusible material 25 which has the property of being relatively soft or molten when hot, and of being hard or relatively hard when it is cooler. The material 25 may be fusible metal or it might be wax, in fact any substance which possesses the desired qualities above mentioned. For example, I have found that lead is one of the best materials to use for this purpose. Extending longitudinally in the center of the barrel 21 is a shaft 26 shouldered at 26ª near its rear end and revolubly mounted in the bushing 24. The other end of the shaft 26 carries a pair of blades 27 which may be held in slots formed in the shaft 26 as indicated in Fig. 5. Rigidly mounted on the rear end of shaft 26 is a ratchet 28 and the beveled edge 18 of pawl 15 normally engages a tooth of the ratchet 28 as shown in Fig. 3 and holds the spring 12 depressed. Secured to the spring 12 is a cross bar 29 provided with two push buttons 30 which afford convenient means for depressing the spring 12 to engage the pawl 15 with the ratchet.

In working with the iron under normal conditions the lead 25 is hard and the blades 27 are thus anchored securely in place and prevent rotation of shaft 26. When the iron becomes heated to a certain degree, above which it would not be desirable to work, the lead 25 melts, whereupon the blades 27 are free to be rotated in the molten lead and the spring 12 acting through pawl 15 turns ratchet 28 and rotates shaft 26 and blades 27 the latter turning in the molten metal and as spring 12 thus springs up it forces up the plug 9, and disengages the clips 10 from terminal blades 7 and supports the plug 9 in a higher position indicated by dotted lines in Fig. 1, so that clips 10 are out of contact with blades 7. I have found in practice that at a critical point in the temperature of the lead it becomes soft so rapidly that the spring 12 moves up very quickly as the blades 27 do not move sluggishly but fairly rapid. That part of the lead in the front end of the barrel becomes softer more quickly than that in the rear portion because the barrel 21 is an integral part of the head 22 and the latter is in close contact with the body of the iron 1 so that heat is imparted by conduction directly to the front end of the barrel and thus the rear end of the barrel does not become hot so quickly. It is preferred to locate the blades 27 in the front end of the barrel so that the lead in the other end of the barrel which lies adjacent the bushing 24 and which does not become so soft will act as a seal for the thinner metal at the front end, and the lead near the bushing not becoming so hot and therefore not becoming so thin will not leak through the bushing 24 around the shaft 26. Obviously the iron commences to cool as soon as the circuit is broken and therefore the lead in the rear end of the barrel is never melted so thin as that in the front end, or so thin that it will run along the bearing in the bushing and thus escape. As a further preventive the shaft 26 is provided with shoulder 26ª which bears against the end of the bushing. Thus none of the lead escapes from confinement.

After the plug 9 has been raised as described it is apparent that if the push buttons 30 are depressed to move down the pawl 15 that the latter although it will engage ratchet 28 will immediately move upward again as the ratchet 28 will turn the blades 27 for the lead being still molten will not resist movement of the blade 27 until it has cooled and hardened to a certain extent. After the laundry iron has cooled sufficiently for the lead to again become hard the blades 27 are then anchored and ratchet 28 is prevented from rotating whereupon the spring 12 may be depressed and pawl 15 again engaged with the ratchet. The plug 9 will then stay in lower position closing circuit through the heating units.

One marked advantage of this construction is that the shaft 26 with its blades 27 and ratchet 28 do not have to be re-set, as irrespective of the angular position of these parts, the ratchet 28 always presents a tooth in position adapted to be engaged by the pawl 15 to hold the latter down. The only re-setting required is to reëngage the pawl to place the spring under tension and to place the plug in contact with the terminals. As none of the lead escapes from the barrel, the device may be used for an indefinite time.

In the device shown in Fig. 6, 32 designates a perforated water pipe arranged in a suitable position in a room and adapted to discharge water to extinguish a fire when water is permitted to flow into the pipe, flow of water into the pipe being regulated by a valve 33 having an arm 34 which is under spring tension produced by a spring 35 tending to turn the arm in a direction to open the valve. 36 designates the thermic controller device which may be secured to the valve 33 and ratchet 37 holds pawl 38 which is connected with lever 34. When the barrel becomes heated to the critical point the material within the barrel fuses and permits ratchet 37 to turn thus removing resistance to spring 35 and permits the latter to swing arm 34 and open valve 33 admitting water to perforated pipe 32 from which the water is delivered to the fire.

Fig. 8 shows the device employed as a circuit breaker or fuse to break a circuit upon an excess current. In this form the fusible material comprises a fusible metal or alloy which is a conductor of electricity. The ratchet 28 is engaged by a pawl 40 connected to a pivoted switch blade 41, which normally contacts with clips 42. Bushing 43 is of insulation. Current passes from wire 44 to barrel 21, through metal 25 and shaft 26, to ratchet 28 and pawl 40, to switch blade 41, clips 42, and wire 45. Upon an excess current the metal fuses, whereupon spring 46 pulls switch blade 41 out of clips 42, the fused metal permitting rotation of the ratchet. Thus the circuit is broken. The circuit may be closed by reëngaging pawl with the ratchet as soon as the metal hardens. In this form the metal is heated, not by external heat as in the two former embodiments, but by the heat caused by the resistance of the fusible metal to the passage of excess current, as the metal forms part of the circuit in this embodiment whereas in the former cases the metal formed no part of an electric circuit.

While I have shown the device as applied in three different ways, it will be apparent that its usefulness may be availed of in a great many different situations, it being useful wherever it is desired to control or operate an element upon a change of temperature for the furtherance of some object.

What I claim is:—

1. A thermic controller comprising a fusible material, means for permanently retaining all the material whether in hard or liquid condition, and a controlling element embedded in the material and held against movement when the material is hard and permitted to move bodily through the material upon softening of the material.

2. A thermic controller comprising a fusible material, means for retaining said material within certain limits whether in hard or liquid condition, and a controlling element anchored in the material and permitted to move to a new position in the material when the material softens.

3. A thermic controller comprising a fusible material, a controlling element anchored by the material and movable when the material softens, and means for confining the fusible material within constant limits.

4. A thermic controller comprising a fusible material, a revoluble element anchored in the material, a projection on said element, and means for turning the revoluble element and moving the projection bodily through the material when the fusible material softens.

5. A thermic controller comprising a fusible material, means completely inclosing said material, and a movable element embedded in said material and extending outside of said inclosing means.

6. A closed receptacle, a fusible material within said receptacle, a shaft extending through the wall of the receptacle into the fusible material, a projection on the shaft normally anchored by the fusible material, and means for turning the shaft when the material softens.

7. A closed receptacle, a fusible material within said receptacle, a shaft extending through the wall of the receptacle into the fusible material, a projection on the shaft normally anchored by the fusible material, a ratchet on said shaft, a switch, means for opening said switch, and a pawl connected to said switch opening means and engaging the ratchet.

8. A closed receptacle, a fusible material within said receptacle, a shaft extending through the wall of the receptacle into the fusible material, a projection on the shaft normally anchored by the fusible material, a ratchet on said shaft, a switch, means for opening said switch, and a pawl connected to said switch opening means and engaging the ratchet, electric heating means, a circuit therefor controlled by said switch, said receptacle receiving heat from said heating means.

9. A closed receptacle, a fusible material within said receptacle, a shaft extending through the wall of the receptacle into the fusible material, a projection on the shaft normally anchored by the fusible material, a ratchet on said shaft, a switch, means for opening said switch, and a pawl connected to said switch opening means and engaging the ratchet, electric heating means, a circuit therefor controlled by said switch, said receptacle receiving heat from said heating means, a portion of said receptacle having direct contact with the heating means whereby that portion becomes heated more rapidly than the other portion.

10. A closed receptacle, a fusible material within said receptacle, a shaft extending through the wall of the receptacle into the fusible material, a projection on the shaft normally anchored by the fusible material, a ratchet on said shaft, a switch, means for opening said switch, and a pawl connected to said switch opening means and engaging the ratchet, electric heating means, a circuit therefor controlled by said switch, said receptacle receiving heat from said heating means, a portion of said receptacle having direct contact with the heating means whereby that portion becomes heated more rapidly than the other portion, said projection being located near the said former portion.

11. A barrel, a fusible material therein, a bushing confining said material, a shaft extending through the bushing, a wing on the inner end of the shaft embedded in the fusible material, a ratchet on the outer end of the shaft, a pawl engaging said ratchet, a flat spring connected to said pawl, a switch plug receptacle, a switch plug therein supported by said spring, electric heating means, and a circuit through said heating means controlled by said plug.

In testimony whereof, I have hereunto set my hand at Ontario, California, this 6 day of May 1908.

EARL H. RICHARDSON.

In presence of—
G. B. HARDING,
W. A. CAVANAGH.